US005217507A

United States Patent [19]

Spirig

[11] Patent Number: 5,217,507

[45] Date of Patent: Jun. 8, 1993

[54] CONTAINER SYSTEM

[76] Inventor: Ernest Spirig, P.O. Box 1140, CH-8640 Rapperswil, Switzerland

[21] Appl. No.: 717,585

[22] Filed: Jun. 19, 1991

[30] Foreign Application Priority Data

Jun. 20, 1990 [GB] United Kingdom ................. 9013700

[51] Int. Cl.[5] ............................................. B01D 19/00

[52] U.S. Cl. ...................................... 55/159; 220/23.6; 206/821

[58] Field of Search ....................... 220/23.6; 206/821; 55/159

[56] References Cited

U.S. PATENT DOCUMENTS

| | | | |
|---|---|---|---|
| 3,308,609 | 3/1967 | McCulloch et al. | 55/337 |
| 3,990,962 | 11/1976 | Gotz | 204/268 |
| 4,124,463 | 11/1978 | Blue | 204/129 |
| 4,332,219 | 6/1982 | Gonzalez | 123/3 |
| 4,450,060 | 5/1984 | Gonzalez | 204/268 |
| 4,478,916 | 10/1984 | Winsel | 429/9 |
| 4,598,832 | 7/1986 | Alonso | 220/4.27 |
| 4,657,827 | 4/1987 | Kujas | 429/12 |

FOREIGN PATENT DOCUMENTS

| | | |
|---|---|---|
| 656650 | 2/1938 | Fed. Rep. of Germany . |
| 2159246 | 6/1973 | Fed. Rep. of Germany . |
| 2349286 | 4/1975 | Fed. Rep. of Germany . |
| 2659253 | 6/1978 | Fed. Rep. of Germany . |
| 2913908 | 10/1980 | Fed. Rep. of Germany . |
| 3639442 | 5/1988 | Fed. Rep. of Germany . |
| 1542467 | 10/1968 | France . |
| 2236028 | 1/1975 | France . |
| 2497834 | 7/1982 | France . |

*Primary Examiner*—Bernard Nozick
*Attorney, Agent, or Firm*—Oblon, Spivak, McClelland, Maier & Neustadt

[57] ABSTRACT

A container system comprising at least two containers, wherein said at least two containers are each dimensioned to have a low external surface area to volume ratio, said system comprising connecting means between adjacent ones of the containers each comprising a tube adapted to fit within respective apertures in the containers to be connected and a sealing means surrounding said tube and adapted to be maintained in sealing engagement about the tube and apertures by compression between the containers joined by the connecting means.

10 Claims, 6 Drawing Sheets

CONTAINER SYSTEM

The present invention relates to a container system for storage of gaseous or liquid fluids. More particularly, but not exclusively, the invention relates to a container system comprising a number of interconnected containers whereby the total volume of the container system may be selected at will.

The invention will be described with particular reference to its use in storage of detonating gas, produced by the eletrolysis of water. However, many other uses can be foreseen and the present invention is not intended to be limited to any one particular utilisation.

Detonating gas is manufactured by the electrolysis of water and comprises a mixture of hydrogen and oxygen. The mixture may be used to produce a useful flame. The mixture of hydrogen and oxygen is not particularly stable since the gases react explosively to reform water, especially in the presence of a catalyst.

Accordingly, it is usual to produce the gas close to the time when it will be used, any storage means between the electrolytic generator and the burner being intended to form a reservoir where the detonating gas is stored at pressures in the range of 50 mbars to about 250 mbars. The container system may also contain electrolyte, such as an acid or alkaline aqueous solution, used for the electrolytic generation of the gas and which is recycled from the container system to the generator and back again.

As stated above, detonating gas is not always stable and under certain conditions the explosive gas mixture may be ignited, such as by catalytically active contamination carried in the feed water or by excessive temperatures within the cell. Any such explosions create an intensive high pressure shock wave, the intensity of which depends upon the storage gas pressure in the container. However, it is certainly sufficient to strain the construction of the container severely. Hence any container must have a comparatively high strength.

Hitherto, containers have been manufactured as cuboids or as substantially cuboidal structures in which two of the faces are comparatively large but with high surface areas to dissipate the heat of the enclosed gas and liquid. These large surfaces are vulnerable to the high pressure shock waves caused by any such explosion. In order to withstand such explosions, the thickness of the material forming the container is normally between 1.5 to 4 mm, depending on the size of the container. It has hitherto usually been thought advisable to strengthen such a design, for example by adding bolts or stays to these large surfaces to absorb the forces of an explosion and thereby limit any deformation of the surfaces. A spherical container is ideal from the point of view of strength, but suffers from heat exchange disadvantages.

Thus, conventional container designs are disadvantageous from the view of possible explosions but they do have one advantage in that they provide a large surface area from which the heat of the electrolyte fluid may be dissipated. If the surface area of the container is reduced, the amount of heat which may be radiated from the surface of the container is correspondingly reduced. Since the electrolysis process produces hot electrolyte and hot gases, the heat exchange function of the container system is important to reduce the aggressiveness of the hot electrolyte and gases. It also serves to reduce the water vapour pressure and thereby reduce condensation in outlet pipes.

Another reason for using comparatively large containers is to provide a sufficient amount of water fuel for the electrolytic generator to avoid the necessity of continual replenishment.

In order to overcome some of the above difficulties, it would be possible to combine a number of containers, each having a low surface to volume ratio (i.e. cylindrical or cuboids of square cross-section), connected together either in series or in parallel by means of external connections such as hoses. The connections of these hoses to the containers produce areas of weakness where any explosion may cause rupture of the container system.

It is an object of the present invention to provide a container system which obviates the above disadvantages.

According to the present invention there is provided a container system comprising at least two containers, each dimensioned to have a low external surface area to volume ratio, and connecting means between the containers or between adjacent ones of the containers, each connecting means comprising a tube adapted to fit within respective apertures in the containers to be connected and a sealing means surrounding said tube and adapted to be maintained in sealing engagement about the tube and apertures by compression between the containers joined by the connecting means.

Preferably the tube comprises a first section of a first outer diameter and adapted to fit within an aperture of a first container and a second section of a second outer diameter greater than said first outer diameter and adapted to fit within an aperture of a second container, the internal diameter of said tube being, optionally, substantially constant.

Alternatively, the tube may comprise a single section having substantially constant internal and external diameters.

A flange may be provided about a median section of the tube, said sealing means comprising two sealing rings, one disposed between each container and the flange.

The system may comprise a plurality of containers disposed one above another to form a stack.

In this case, two or more such stacks may be disposed one along side another with lateral connections between at least some of the containers of each stack.

In cases where the input to said system comprises a mixture of a gas and a liquid, the input connection to the system may be at an intermediate container, with gas passing therefrom to an upper container and liquid passing from the intermediate container to a lower one. In this case, separate outputs may be provided, one for gas and another for liquid.

Embodiments of the present invention will now be more particularly described by way of example and with reference to the accompanying drawings, in which.

Figure 1:
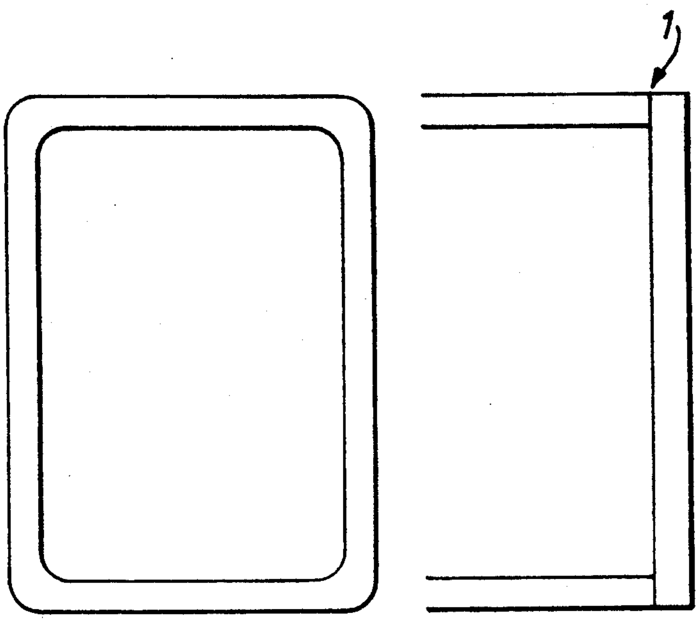
FIG. 1 is a cross-sectional view of a preferred shape of individual container, showing alongside one design approach for welding an end plate to the container.
Figure 2:
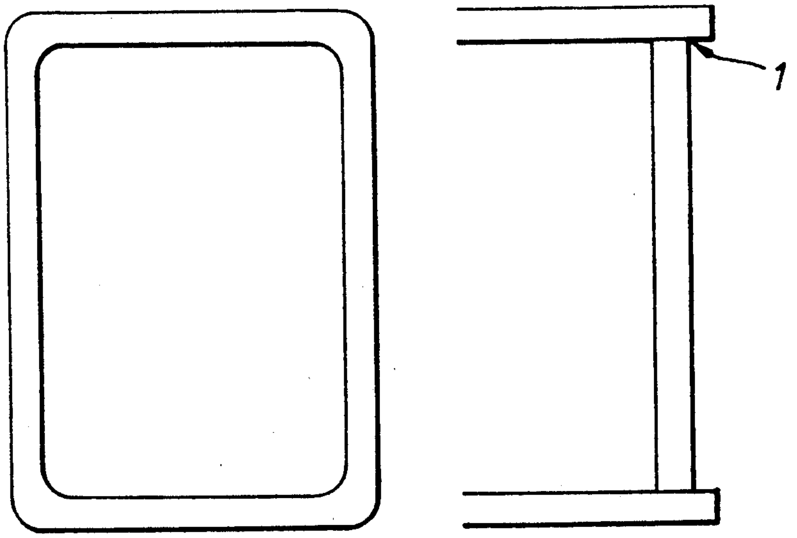
FIG. 2 is a similar cross-sectional view showing an alternative approach to welding the end plate on the structure.

Referring now to the drawings, each container of the system has preferably a rectangular shaped crosssection, as shown in FIGS. 1 and 2. Connections between containers in such a system may be made in either vertical or horizontal faces of the container, and the rectangular cross-section improves the "squeeze and seal" connection described in more detail below. Ends of the rectangular profile tube may be welded on either as shown in FIG. 1 or as shown in FIG. 2, the weld lines being indicated by numeral 1. Of the two, the embodiment shown in FIG. 2 is generally preferred for its better welding conditions. Other methods may be used, for example by forging the end plates to close over the ends.

Figure 3:
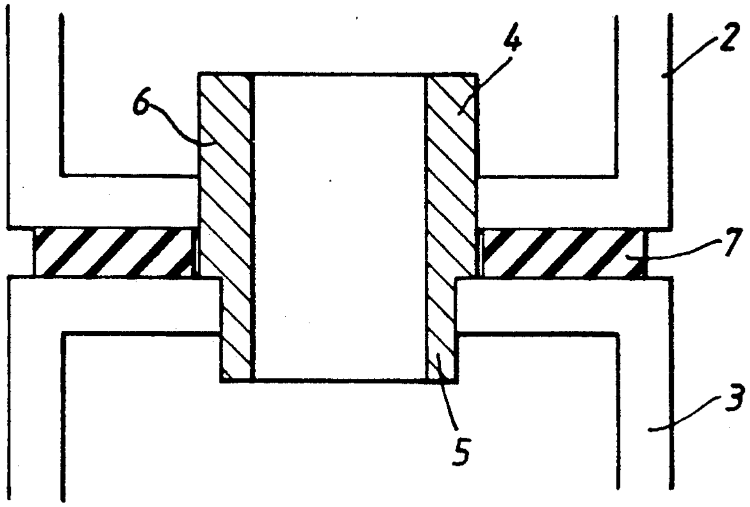
FIG. 3 is a cross-sectional view showing a connection between two containers of the system.

Referring now to FIG. 3, an upper container 2 is joined to a lower container 3 by means of a connector 4. The connector 4 comprises a tube of constant internal diameter but having a lower section 5 of reduced external diameter when compared with an upper section 6. The apertures in the containers 2 and 3 are differently sized, each corresponding to one of the external diameters of sections 5 and 6. It is preferred that the lower container 3 has the smaller sized aperture.

Figure 8:
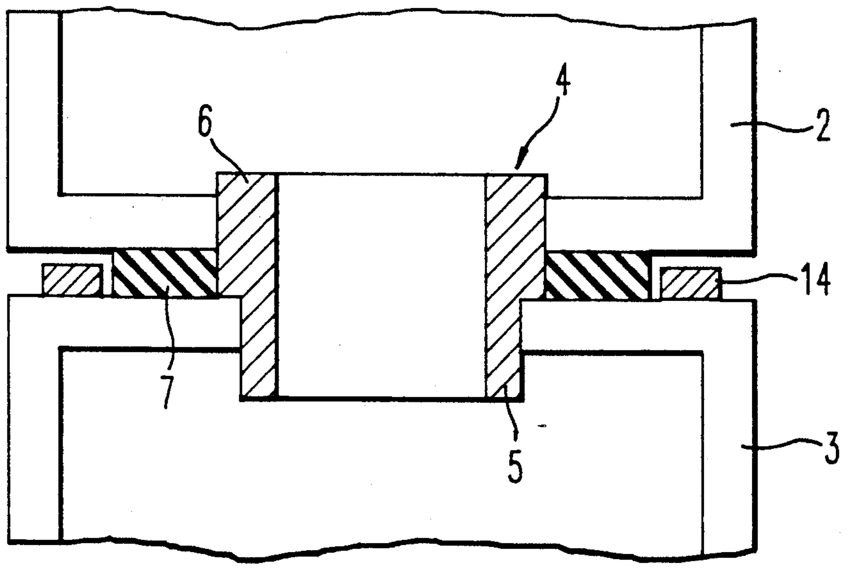
FIG. 8 is a cross-sectional view of a second alternative form of connection between two containers.

In order to connect the containers, the tube connector 4 has its small diameter section 5 inserted in an aperture in the lower container 3 of corresponding dimensions. The tube connector 4 is pushed home, and the larger external diameter section 6 prevents the connector from falling into the container. An annular seal 7 is then placed around the tube connector 4 and the upper container 2 located with its lower aperture surrounding the large diameter section 6 of the tube connector 4. As shown in FIG. 8, an outer rigid jacket 14 having a thickness slightly less than that of the seal 7 may be placed around the seal.

Figure 5:
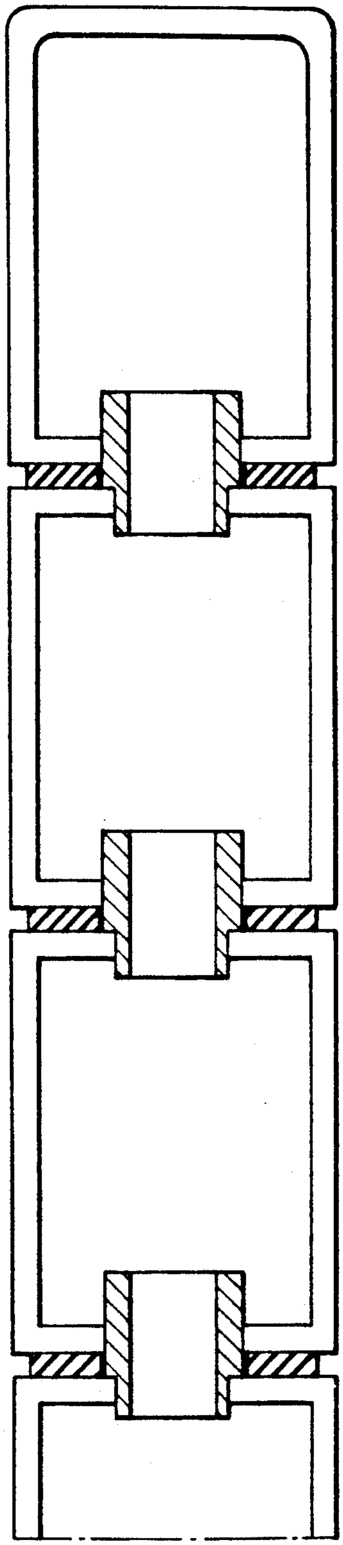
FIG. 5 is a transverse cross-sectional view of a stack of containers.

A series of such connections is seen in FIG. 5, where the containers form a stack, each one connected to the adjacent ones in the stack. The entire stack may then be surrounded by metal straps and squeezed together so that the seals 7 secure the connections between containers.

Figure 6:
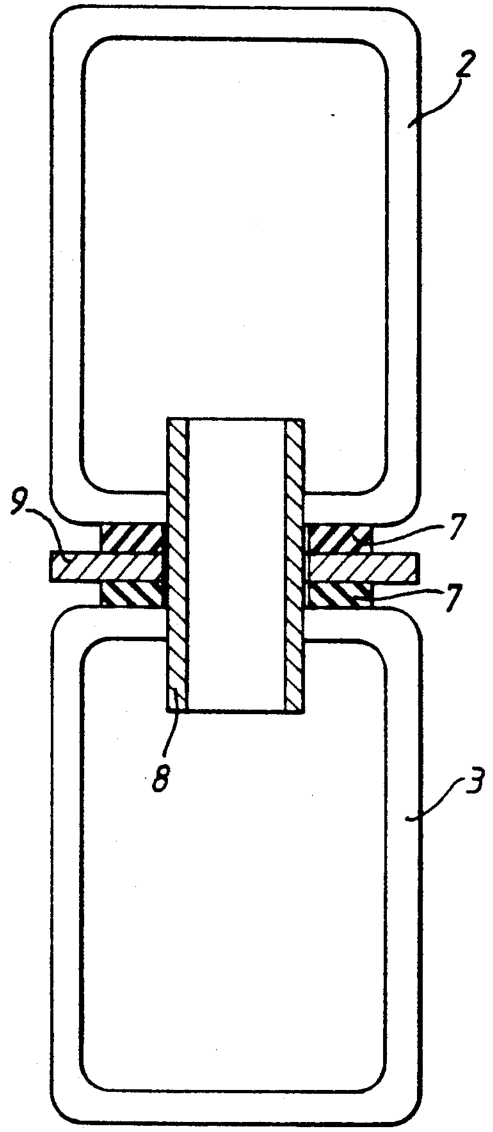
FIG. 6 shows an alternative form of connection between two containers.
Figure 7:
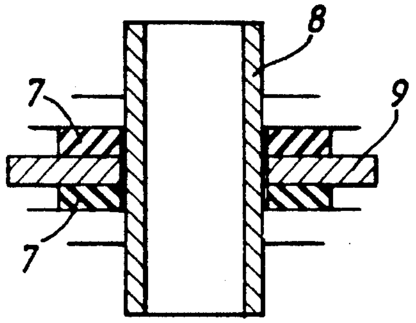
FIG. 7 shows the connector of FIG. 6 separately.

An alternative form of connector is shown in FIGS. 6 and 7 where the tube connector 8 is a cylinder of constant internal and external diameters. At a median point of the tube connector 8, a radially extending flange 9 is provided which is optionally connected to the tube connector 8. To assemble such connection, a pair of seals 7 surround the tube, one each side of the flange 9. An outer rigid jacket may also be provided in this case. The tube is then connected into apertures of equal diameter in containers 2 and 3 and the assembly squeezed together by means of metal straps or the like. The containers 2 may be connected permanently, for example by welding.

Figure 9:
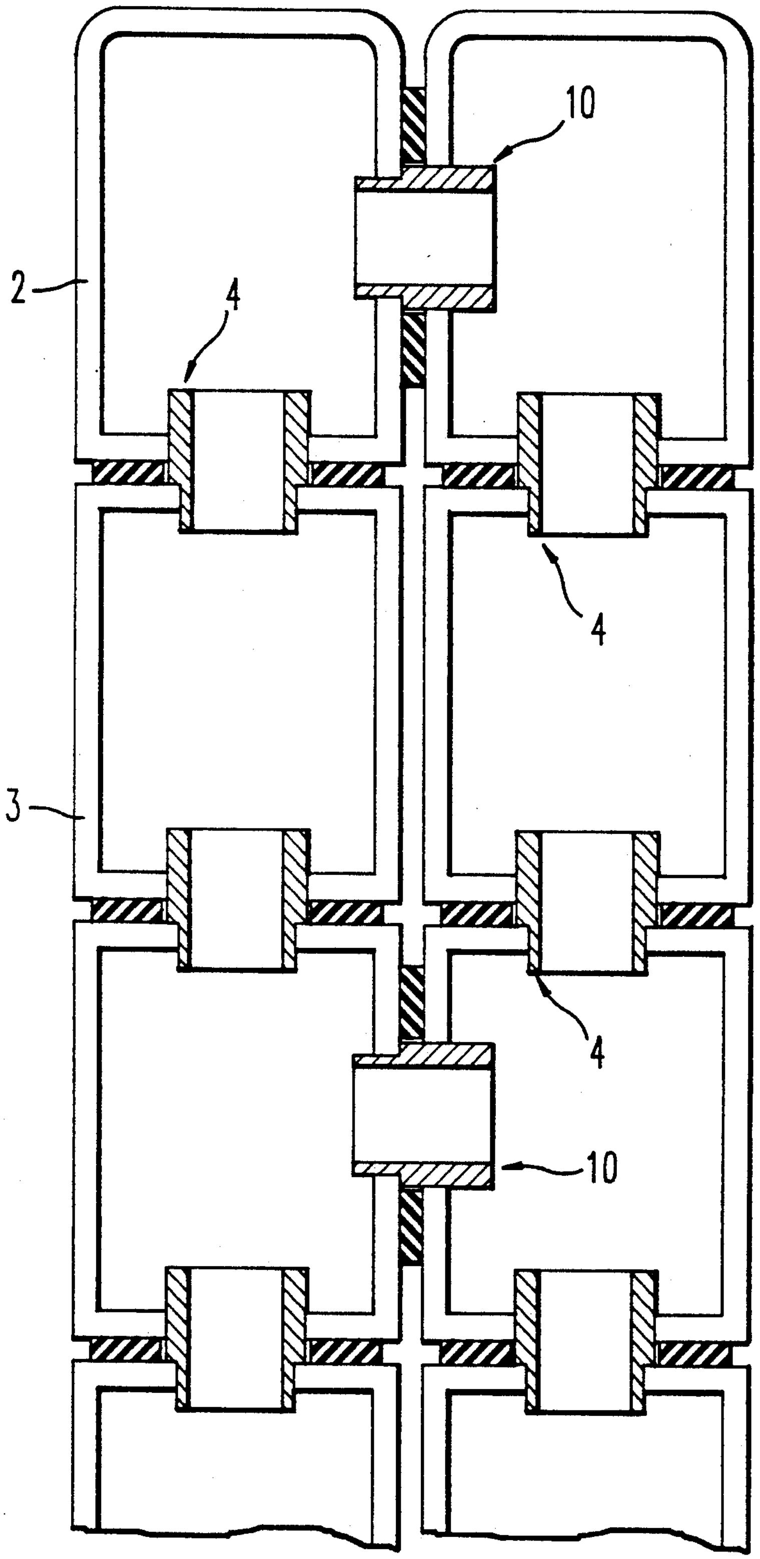
FIG. 9 is similar to FIG. 5 but showing one stack of containers located along side a second stack.

The seals 7 may be made of any conventional resilient material, such as rubber or plastics material. For some applications, the seals 7 may even be made from soft metals, e.g. gold. As shown in FIG. 9, there may be two or more stacks of containers one along side another with lateral connectors 10 identical to connectors 4, it is possible for connectors either as shown in FIG. 3 or as shown in FIGS. 6 and 7 to be used to connect containers in a horizontal or transverse direction.

Figure 4:
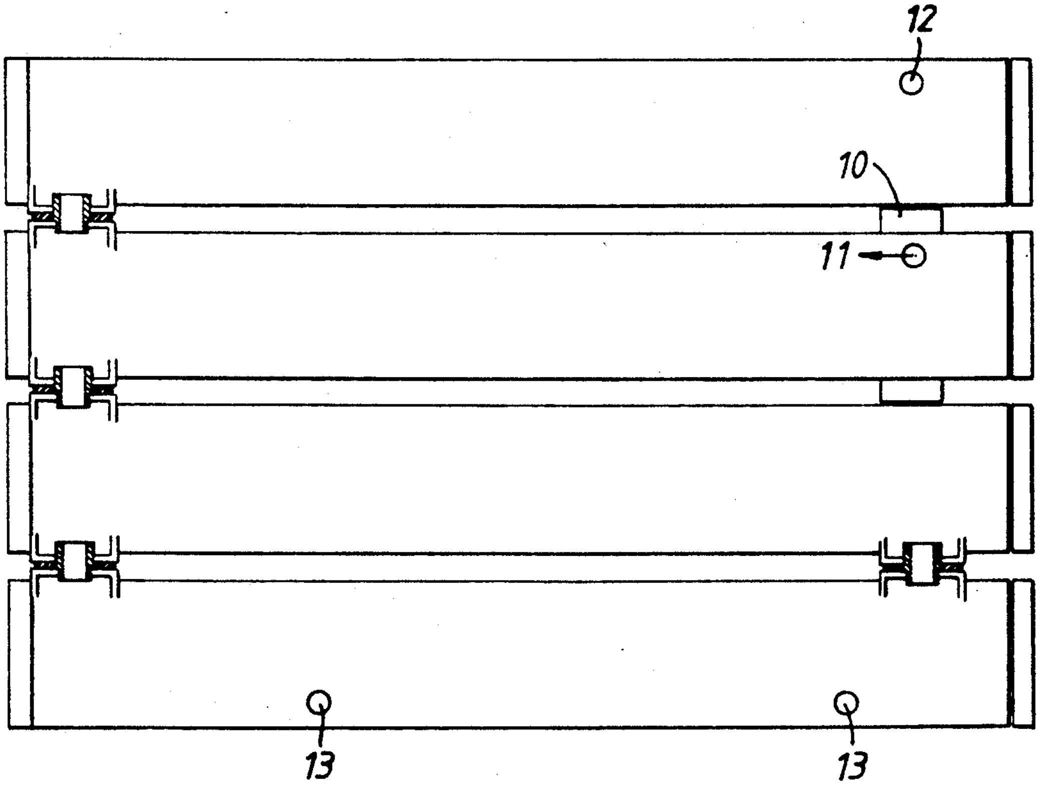
FIG. 4 shows a stack of containers with various interconnections between them.

Referring now to FIG. 4, there is shown a stack of four containers. The lowermost two are connected by means of a connection arrangement at each end of the container, while the uppermost three have connections at one end only but with metal spacers 10 at their other end so that the design is properly balanced. The spacers 10 may be of a material other than metal to allow the individual containers better to be thermally decoupled.

In the arrangement shown, the output of an electrolytic generator is fed to the third container as shown by arrow 11. The mixture of detonating gas and water separates mainly in this container with the gas going upwardly to the fourth and uppermost container and the water passing downwardly to the first and second containers. As it does so, more gas separates from the liquid and finds its way upwardly. Detonating gas may be withdrawn at point 12 while water may be recycled to the electrolytic generator from points 13.

Each container of the system has a low surface area to volume ratio, and is therefore more resistant to explosions of the mixture than would otherwise be the case. The connections between containers are also resistant to such explosions since they are of minimal length and are surrounded by a seal. However, the containers are separated one from another either by the connector or by a spacer 10 and thus there is, in total, a large surface area for heat exchange between the medium and the ambient atmosphere. The amount of water stored for use in the electrolytic generator may be increased simply by adding additional containers to the system.

One further advantage of a system embodying the invention lies in the thermal decoupling of the individual containers. In a single large container, the gas and liquid will have approximately the same temperature. If the gas and liquid may be separated into different, but joined, containers, the gas should cool more quickly, an effect which increases if the gas occupies or passes through several thermally decoupled containers.

Furthermore the gas flow may change direction when flowing from one container to another, and any entrained droplets of electrolyte may impact the internal surfaces and be removed from the gas flow.

As stated above, the present invention is not directed exclusively towards containers for storage of detonating gas. It may be used to provide a high strength, high surface area vessel for any type of application, especially heat exchange applications, such as radiators, boilers and the like.

The preferred shape of the containers is substantially square in cross section, although other shapes, such as cylinders may be used.

Another advantage of the system, especially when used in the electrolysis of water to form detonating gas, is that the containers and connectors form sludge traps. In such a process, the electrolyte may be caustic potash solution which is recirculated by means of an electric circulation pump between the container system, where it is degassed and separated, and the electrolyser.

Residues of the electrode materials may gradually build up and be carried around the system. This is true of nickel electrodes and even more so when the electrodes are of nickel coated steel.

If the electric pumps are of the leak free type, there is a magnetic field which attracts magnetic particles, such as iron or nickel. These particles are attracted to slots in the pump and start to block it. This can cause overheating of the system and therefore detonation of the gas.

However, since the connectors protrude into the containers, there is provided, at the base of such containers, a still zone in which sludge may settle. This effectively removes it from circulation, thereby improving the efficiency of the system.

I claim:

1. In a container system comprising at least two adjacent containers, each dimensioned to have a low external surface area to volume ratio, said containers having respective opposed walls facing each other, one wall having an aperture therein aligned with an aperture in the other wall, means for connecting said containers comprising a tube having first and second sections correspondingly dimensioned with the respective aligned apertures in said container walls and which can be pushed respectively into said aligned apertures, and sealing means surrounding said tube between said opposed walls, compression of said sealing means between said walls maintaining said sealing means in sealing engagement with said walls about said tube and said apertures.

2. In a container system as claimed in claim 1 wherein said first section of said tube has an outer diameter of a size enabling said section to be fitted by pushing into a correspondingly dimensioned aperture of one of said containers, and said second section has an outer diameter greater than said first outer diameter for being fitted by pushing into a correspondingly dimensioned aperture of the other of said containers, the internal diameter of said tube being substantially constant.

3. In a container system of claim 9 wherein said tube is a unitary component and both sections thereof have substantially the same internal and external diameters.

4. In a container system as claimed in claim 1, wherein a flange is provided about a median section of said tube, said sealing means comprising two sealing rings, one disposed between a respective wall of each container and said flange.

5. In a container system of claim 4, wherein said flange is connected to said tube.

6. In the container system as claimed in claim 1, wherein said connecting means comprises a rigid outer jacket adapted to surround the sealing means.

7. A container system as claimed in claim 6, wherein said rigid outer jacket has a dimension parallel to the axis of said tube which is slightly less than the corresponding dimension of said sealing means.

8. In the container system as claimed in claim 1, wherein a plurality of containers are disposed one above another to form a stack.

9. A container system as claimed in claim 8, wherein two or more said stacks are disposed one alongside another with lateral connections between at least some of the containers of each stack.

10. A container system as claimed in claim 8, in which the input to said system comprises a mixture of a gas and a liquid, the input connection to the system is at an intermediate container, with gas passing therefrom to an upper container and liquid passing from the intermediate container to a lower one, the system preferably having separate outputs, one for gas and another for liquid.

* * * * *